Figure 1:
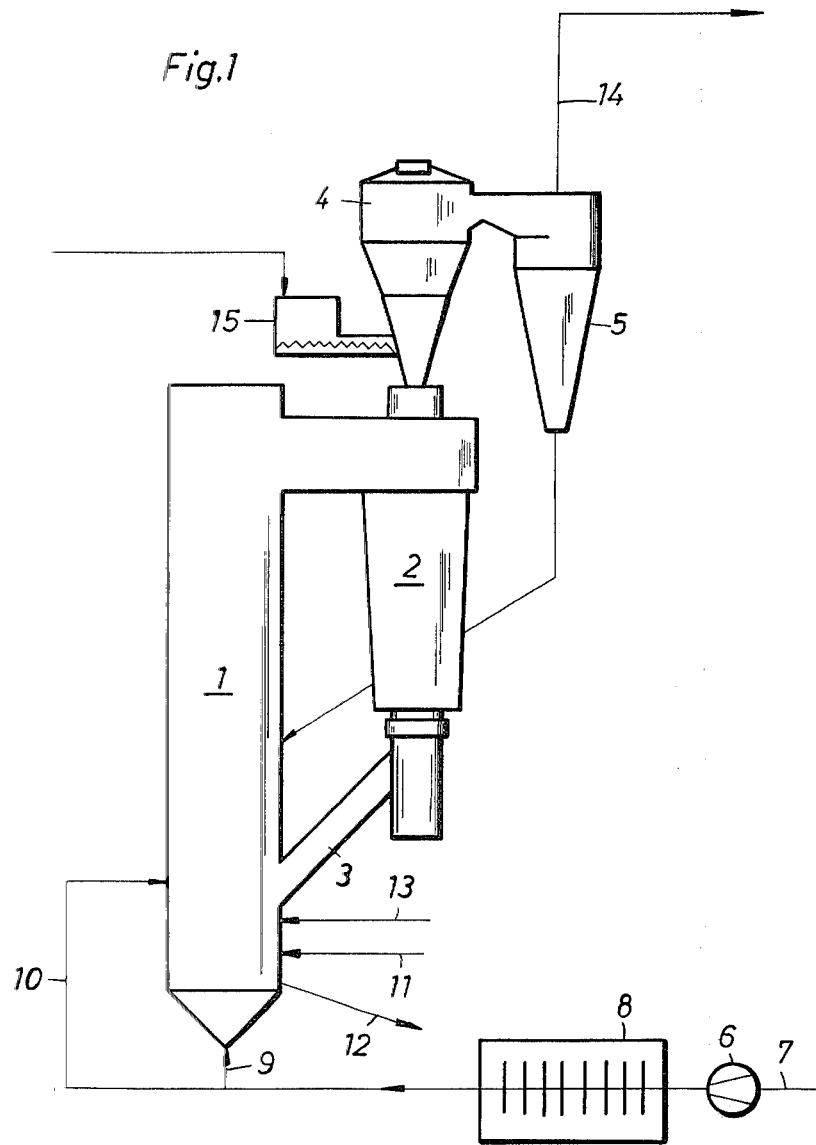

United States Patent [19]

Daradimos et al.

[11] 4,304,759

[45] Dec. 8, 1981

[54] PROCESS FOR OBTAINING METAL OXIDE AND SO$_2$-CONTAINING GASES ESSENTIALLY FREE OF SO$_3$ AND H$_2$SO$_4$ FROM FERROUS SULPHATE CONTAINING SALT

[75] Inventors: Georg Daradimos, Maintal; Martin Hirsch; Lothar Reh, both of Frankfurt am Main; Jörg Thomas, Bad Vilbel, all of Fed. Rep. of Germany

[73] Assignee: Metallgesellschaft AG, Frankfurt, Fed. Rep. of Germany

[21] Appl. No.: 145,561

[22] Filed: May 1, 1980

Related U.S. Application Data

[63] Continuation of Ser. No. 48,573, Jun. 14, 1979, abandoned, which is a continuation of Ser. No. 882,707, Mar. 2, 1978, abandoned.

[30] Foreign Application Priority Data

Mar. 12, 1977 [DE] Fed. Rep. of Germany ....... 2710978

[51] Int. Cl.$^3$ .................... C01B 17/50; C01G 49/06
[52] U.S. Cl. ................ 423/148; 423/DIG. 2; 423/540; 423/541 R; 423/633
[58] Field of Search ................ 423/633, DIG. 2, 540, 423/541 R, 148

[56] References Cited

U.S. PATENT DOCUMENTS

| | | | |
|---|---|---|---|
| 2,394,579 | 2/1946 | Ayers | 423/633 X |
| 3,554,733 | 1/1971 | Colombo et al. | 423/633 X |
| 3,579,616 | 5/1971 | Reh et al. | 423/625 |
| 3,812,242 | 5/1974 | Barilli et al. | 423/633 X |
| 3,906,039 | 9/1975 | Furkert | 423/540 |
| 3,917,800 | 11/1975 | McGauley et al. | 423/541 R |
| 4,049,788 | 9/1977 | Bierbach et al. | 423/633 X |

*Primary Examiner*—Jack Cooper
*Attorney, Agent, or Firm*—Sprung, Felfe, Horn, Lynch & Kramer

[57] ABSTRACT

The invention provides a process for thermally decomposing salts, containing mainly ferrous sulfate wherein said feed material is contacted in a single suspension-type exchanger with exhaust gases formed by reaction of the oxygen-containing gases in the fluidized bed reactor, the fluidizing gas and at least a partial stream of the secondary gas stream are heated by an indirect heat exchange in a fuel-heated heat exchanger, and the quantity of oxygen introduced via which consists of the fluidizing gas and the secondary gas, is controlled in dependence on the quantity of fuel in order to receive an exhaust gas from the suspension-type exchanger with a free oxygen content of 1-6% by volume and a temperature of 300°-450° C.

6 Claims, 2 Drawing Figures

PROCESS FOR OBTAINING METAL OXIDE AND SO₂-CONTAINING GASES ESSENTIALLY FREE OF SO₃ AND H₂SO₄ FROM FERROUS SULPHATE CONTAINING SALT

This is a continuation of application Ser. No. 048,573, filed June 14, 1979 now abandoned, which in turn is a continuation of Ser. No. 882,707 filed Mar. 2, 1978 now abandoned.

This invention relates to a process for thermally decomposing salts which contain mainly ferrous sulfate, in a circulating fluidized bed, wherein a major part of the resulting metal oxide is discharged together with the gas from the top part of the shaft and is separated from the gas in a recycling cyclone and is recycled at least in part to the fluidized bed, the exhaust gas from the fluidized bed reactor is contacted with feed salt containing mainly ferrous sulfate, the fluidized state is maintained by oxygen-containing fluidizing gas, which has been preheated, and by oxygen-containing secondary gas, which has been preheated and fed above the inlet for the fluidizing gas, and fuel is fed into the zone between the inlets for the fluidizing gas and secondary gas.

Numerous chemical processes involve a formation of metal sulfates which must not be dumped for ecological reasons or which contain valuable substances, which can be economically recovered.

The recovery process that is most important by far is a thermal decomposition process which results in a formation mainly of metal oxide and sulfur dioxide. The resulting sulfur dioxide is condensed or is used in known processes for producing sulfuric acid. The resulting metal oxides may be processed further by other known methods.

More recently, the fluidized bed reactor has proved to be a particularly important unit for decomposition processes. A special advantage of such reactor resides in that a metal oxide which is virtually free from sulfur is obtained in a single operation (Printed German application No. 1,191,344; Opened German Specification No. 23 39 859; Opened German Specification No. 24 02 038). Those fluidized bed reactors which are considered as orthodox because they operate at a relatively low velocity of the turbulent gas have the disadvantage that the throughput rate per unit of cross-sectional area is not as high as is desired. Certain difficulties are also involved in the complete combustion particularly of liquid or gaseous fuels.

The disadvantage mentioned in connection with the orthodox fluidized bed are avoided in another fluidized bed process which uses a so-called expanding fluidized bed and can also be used to decompose metal sulfate, the turbulent gases formed by the fluidizing gas and the secondary gas are controlled to flow at such a high gas velocity that a major part of the solids is entrained by the gas leaving the upper part of the shaft and is usually separated from the gas and then recycled to the fluidized bed reactor (U.S. Pat. No. 3,579,616). On the other hand, that process is not satisfactory, particularly for the decomposition of salts which contain mainly ferrous sulfate and especially when such salts contain also adherent sulfuric acid, because the exhaust gas temperature cannot be adjusted in a technologically advantageous manner since a multi-stage suspension-type exchange system is involved.

It is an object of the invention to provide for the thermal decomposition of salts which contain mainly ferrous sulfates a process which is free from the disadvantages of the known processes, particularly the disadvantages mentioned hereinbefore, and which can be carried out in a simple manner.

In a process of the kind defined first hereinbefore, this object is accomplished in accordance with the invention in that the salt which contains at least one mol of water of crystallization and contains mainly ferrous sulfate is contacted in a single suspension-type exchanger with exhaust gases formed by the reaction of oxygen-containing gases in the fluidized bed reactor, the fluidizing gas and at least a partial stream of the secondary gas stream are heated by an indirect heat exchange in a fuel-heated heat exchanger, and the quantity of oxygen introduced via the fluidizing gas and the secondary gas is controlled in dependence on the quantity of fuel in order to receive an exhaust gas from the suspension-type exchanger with a free oxygen content of about 1-6% by volume and a temperature of about 300°-450° C.

In accordance with the invention feed salt containing mainly ferrous sulfate means a salt containing for example 40 to 85% by weight ferrous sulfate (calculated as $FeSO_4$).

The above-mentioned requirements to be met by the exhaust gas are essential for the process because they ensure that iron is oxidized to trivalent iron and any free sulfuric acid which adheres to the salt is chemically combined as a result of the increase of the valency of the iron. This will avoid an otherwise inevitable elimination of sulphuric acid or sulfur trioxide by distillation. The exhaust gas temperature is also significant for the subsequent dust collection, particularly in an electrostatic precipitator, and for avoiding of corrosion.

It will be particularly desirable to feed fuel at a constant rate into the zone between the inlets for the fluidizing gas and the secondary gas and to adjust the exhaust gas at the desired temperature by a control of the temperature to which the fluidizing gas and the secondary gas are indirectly heated.

According to another preferred feature of the process the oxygen contents of the fluidizing gas and the secondary gas are controlled so that a mean oxygen concentration of at least 25% by volume, preferably in the range of 25 to 28% by volume, results. The mass flows of the two gases must obviously be taken into account in calculating the mean oxygen concentration. The reaction of the gas streams with fuel has not yet been considered too. For instance, air may be used as fluidizing gas and as secondary gas and highly enriched or pure oxygen may be fed through a gas lance directly into the zone between the inlets for the fluidizing gas and secondary gas. Alternatively air may be enriched with oxygen before the air is fed to the fuel-fired heat exchanger.

In a modification of the process according to the main claim, a further feature of the invention resides in that if oxygen-containing gases supplied to the fluidized bed reactor contain at least 30% by volume oxygen, on an average, the preheating of the fluidizing gas and secondary gas is omitted. The use of gases which are so highly enriched with oxygen could otherwise involve difficulties in the control of the desired exhaust gas temperature. Under the proposed conditions, the exhaust gas temperature can easily be controlled merely by the division of the gas into fluidizing and secondary gases and by the control of the fuel feed rate.

The control of the rate of fluidizing and secondary gases and the selection of the level at which the secondary gas is fed into the fluidized bed reactor is effected in known manner, e.g., in the manner which is known from U.S. Pat. No. 3,579,616.

In consideration of the newly fed material, the operating conditions in the fluidized bed reactor are selected so that a suspension having a mean density of 20–300 kg/m³ is obtained in the zone between the inlets for the fluidizing gas and secondary gas and a suspension having a mean density of 1–20 kg/m³ in the zone above the secondary gas inlet.

When Froude's and Archimedes' numbers are used to define these conditions of operation in the fluidized bed reactor, the following ranges are obtained:

$$0.1 < \tfrac{3}{4} \times Fr^2 \times \frac{\rho_g}{\rho_k \rho_g} < 10$$

and $$0.1 < Ar < 100$$

wherein $$Ar = \frac{d_k^3 \times g(\rho_k \rho_g)}{\rho_g \times v^2}$$

In these expressions
Fr = Froude's number
Ar = Archimedes' number
$\rho_g$ = density of gas in kg/m³
g = constant of gravitation in m/sec.²
$\rho_k$ = density of solid particles in kg/m³
$d_k$ = diameter of spherical particle in m
$v$ = kinematic viscosity in m²/sec.

Because the oxygen-containing gases are supplied in at least two partial streams, the reactor volume is divided into a reducing lower zone, which is disposed below the inlet for the secondary gas, and an oxidizing upper zone which is disposed above the inlet for the secondary gas. Owing to the intense circulation of the solids in the fluidized bed, these zones are virtually at the same temperature. This affords the advantage that the decomposition is effected under desirable reducing conditions and nevertheless the afterburning above the secondary gas inlet results in a complete utilization of the fuel.

The process according to the invention may be used to special advantage for the decomposition of salts which have become available in the production of titanium dioxide and which in addition to ferrous sulfate contain sulfates of magnesium, aluminum and manganese in small quantities. The salt may be a so-called calcined green salt having a low water content or a filter salt, which may contain a large amount of adhering sulfuric acid. The process according to the invention is particularly significant in the processing of filter salts because it results in a chemical combination of the free sulfuric acid to form sulfate.

When usually large quantities of adhering acid prevent a chemical combination of the entire free acid to trivalent iron formed by a transformation of divalent iron, the process may be carried out in an improved manner in that metal oxide formed by the decomposition is added to the sulfate which is to be fed to the suspension-type exchanger.

To ensure an oxidation of the divalent iron to trivalent iron, the residence time of the salt which consists mainly of ferrous sulfate in the suspension-type exchanger should be at least 0.5 min. This residence time may be adjusted, if desired, by a recycling of salts from the separator which succeeds the suspension-type exchanger.

The invention will be explained more fully and by way of example with reference to the drawings and the examples.

Figure 2:
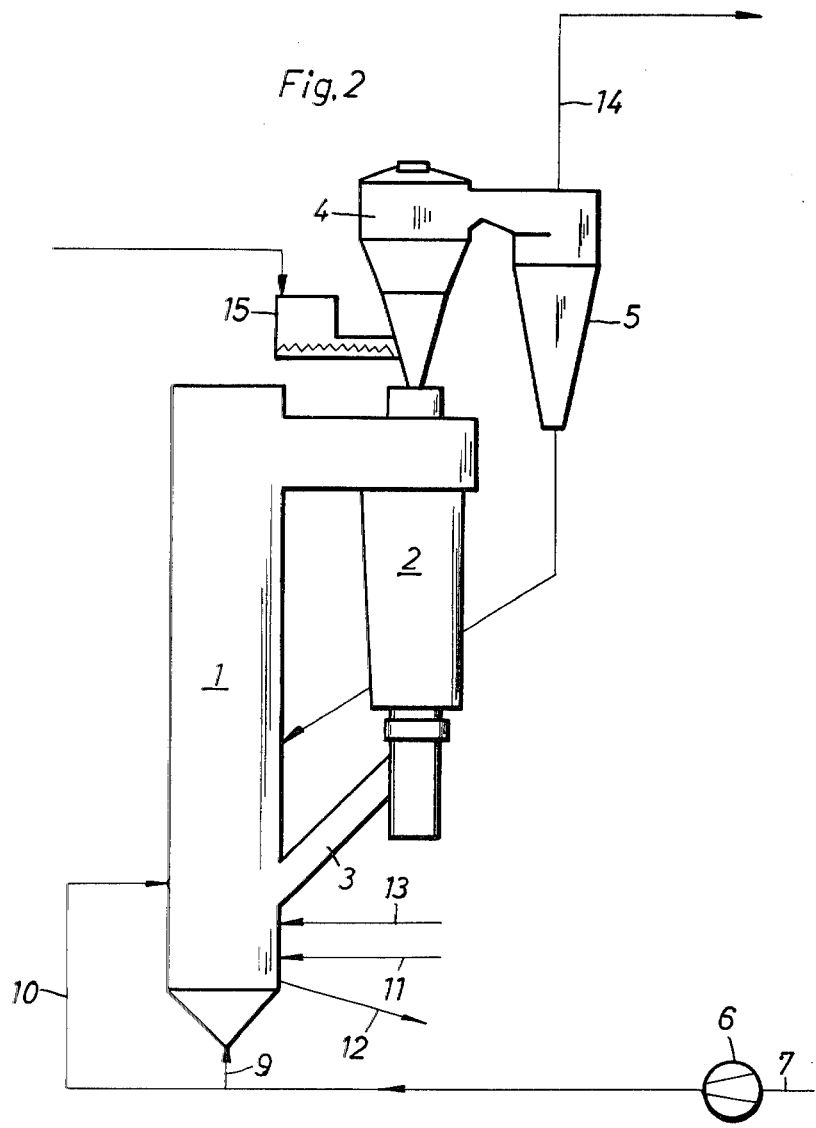

FIG. 1 is a flow diagram illustrating the process in which the gases are preheated and FIG. 2 is a flow diagram illustrating the process in which the gases are not preheated.

The plant which is employed comprises a fluidized bed reactor 1, a succeeding recycling cyclone 2, and a recycling conduit 3. In the gas flow path the recycling cyclone 2 is succeeded by a single-stage suspension-type exchanger 4 and a cyclone separator 5 associated therewith. Another cyclone separator may succeed the first. A blower 6 is incorporated in the gas conduit 7. A fuel-fired heat exchanger 8 serves to heat the oxygen-containing gases by an indirect heat exchange. Conduits 9 and 10 conduct fluidizing and secondary gases, respectively. The secondary gas conduit may consist of a ring conduit having a plurality of gas inlets in one plane or in a plurality of planes. Fuel is fed into the fluidized bed by a conduit 11, and metal oxide is withdrawn through a discharge device 12. A conduit 13 may be used to feed highly enriched or pure oxygen. An exhaust gas conduit 14 and a feeder 15 are also indicated.

In the embodiment of the invention illustrated in FIG. 2 the heat exchanger 8 is omitted. All other reference numbers relate to the same parts as in FIG. 1.

EXAMPLE 1 (WITH REFERENCE TO FIG. 1)

The process was carried out with a fluidized bed reactor 1 having a cylindrical shaft which had a cross-sectional area of 0,1 m² and a height of 8 meters. The inlet connected to the secondary gas conduit 10 had an elevation of 2 m.

By means of the feeder 15, the suspension-type exchanger 4 was fed at a rate of 265 kg/h with metal sulfate having a mean particle diameter of 350 μm and following chemical composition in % by weight:

| | |
|---|---|
| $FeSO_4 \cdot 1.5H_2O$ | 95,4 |
| $MgSO_4 \cdot H_2O$ | 3,3 |
| $Al_2(SO_4)_3 \cdot 4H_2O$ | 0,3 |
| $MnSO_4 \cdot H_2O$ | 1,0. |

By means of the exhaust gas formed by the decomposition and leaving the fluidized bed reactor 1 at a temperature of 950° C., the feed was heated to 350° C. so that the gases formed by decomposition were cooled to 350° C. The exhaust gas became available at a rate of 310 standard m³/h (based on moist gas) and had the following composition in % by volume:

| | |
|---|---|
| $SO_2$ | 9.5 |
| $CO_2$ | 8.9 |
| $N_2$ | 50.6 |
| $H_2O$ | 27.7 |
| $O_2$ | 3.3 |

It left the system through the exhaust gas conduit 14 and was subjected to a dust-collecting treatment and cooled before it was processed to produce sulfuric acid. When the feed had been preheated to 350° C. and had been separated from the exhaust gas in the cyclone separator 5, it was fed through a conduit into the fluidized bed reactor 1 and was decomposed therein at a temperature of 950° C. After a residence time of 40 minutes, metal oxide having a density of 4 kg/l was discharged through discharge device 12 at a rate of 120 kg/h.

The fluidized bed reactor 1 was fed through conduit 9 with 100 standard m³/h air as fluidizing gas and through conduit 10 with 100 standard m³/h air as secondary gas, which has previously been preheated to 350° C. in the heat exchanger 8. The fluidized bed reactor 1 was heated with fuel oil at a rate of 17 kg/h (lower calorific value=9600 kcal/kg), which was fed in fuel conduit 11.

EXAMPLE 2 (WITH REFERENCE TO FIG. 1)

Additional experiments were carried out with the plant and the feed described in Example 1. The material to be treated was also fed at a rate of 265 kg/h. Calcined material having a density of 4 kg/l was discharged at a rate of 120 kg/l. The residence time was 40 min. The following streams and operating conditions are subsequently stated.

| Experiment | 2a | 2b | 2c |
|---|---|---|---|
| Rate of fluidizing gas, standard m³/h | 100 | 80 | 60 |
| Rate of secondary gas, standard m³/h | 120 | 110 | 140 |
| $O_2$ concentration, % by volume | 21 | 21 | 25 |
| Preheating to, °C. | 200 | 450 | 150 |
| Fuel oil rate, kg/h | 19 | 16 | 20 |
| Temperature in fluidized bed reactor, °C. | 950 | 950 | 950 |
| Exhaust gas temperature, °C. | 400 | 320 | 390 |
| Exhaust gas rate, moist, standard m³/h | 340 | 300 | 310 |
| Composition of Exhaust Gas | | | |
| $SO_2$ | 8.5 | 9.6 | 9.4 |
| $CO_2$ | 8.8 | 8.6 | 10.0 |
| $N_2$ | 52.3 | 51.0 | 47.4 |
| $H_2O$ | 26.9 | 27.2 | 29.3 |
| $O_2$ | 3.5 | 3.6 | 3.9 |

EXAMPLE 3 (WITH REFERENCE TO FIG. 1)

The same plant as in Example 1 was used to decompose a so-called filter salt having a mean particle diameter of 250 μm and the following chemical composition in % by weight:

| | |
|---|---|
| $FeSO_4 \cdot H_2O$ | 61.0 |
| $MgSO_4 \cdot H_2O$ | 6.5 |
| $MnSO_4 \cdot H_2O$ | 0.6 |
| $Al_2(SO_4)_3 \cdot 4H_2O$ | 0.4 |
| $TiOSO_4$ | 1.5 |
| $H_2SO_4$ | 15.0 |
| $H_2O$ | 15.0 |

The streams and operating conditions were as follows:

| | |
|---|---|
| Feed rate | 300 kg/h |
| Fluidizing gas rate | 120 standard m³/h |
| Secondary gas rate | 90 standard m³/h |
| $O_2$ concentration | 21% by volume |
| Preheating to | 500° C. |
| Fuel oil rate | 21 kg/h |
| Temperature in fluidized bed furnace | 950° C. |
| Exhaust gas temperature | 450° C. |
| Exhaust gas rate (moist) | 380 standard m³/h |
| Exhaust gas composition in % by volume | 9.0 $SO_2$; 8.7 $CO_2$; 48.0 $N_2$; 31.5 $H_2O$; 2.8 $O_2$ |

Calcined material having a density of 3.2 kg/l was obtained at a rate of 105 kg/h.

Because the oxygen concentration in the exhaust gas was controlled at 2.8% by volume, the adhering sulfuric acid contained in the filter salt was chemically combined in the suspension-type exchanger 4 to the iron which had been transformed to trivalent iron so that a separation of sulfuric acid or of sulfur trioxide by distillation was avoided.

EXAMPLE 4 (WITH REFERENCE TO FIG. 2)

Filter salt having the properties stated in Example 3 was decomposed at the rate stated in Example 3 in the equipment described in Example 1. Different from the preceding Example, the fluidizing and secondary gases were not preheated. Oxygen having a concentration of 70% was fed through the oxygen conduit 13 in order to adjust the mixture to an oxygen concentration of 30 or 35% by volume.

The other streams and operating conditions are stated in the following table:

| Experiment | 4a | 4b |
|---|---|---|
| Fluidizing gas rate, standard m³/h | 70 | 70 |
| Secondary gas rate, standard m³/h | 84 | 42 |
| $O_2$ rate in conduit 13, standard m³/h | 36 | 48 |
| $O_2$ concentration, % by volume | 30 | 35 |
| Preheating to, °C. | 25 | 25 |
| Fuel oil rate, kg/h | 24 | 23 |
| Temperature in fluidized bed reactor, °C. | 950 | 950 |
| Exhaust gas temperature, °C. | 450 | 420 |
| Exhaust gas rate (moist), standard m³/h | 360 | 330 |
| Composition of exhaust gas: in % by volume: | | |
| $SO_2$ | 9.5 | 10.4 |
| $CO_2$ | 10.7 | 11.2 |
| $N_2$ | 36.4 | 30.0 |
| $H_2O$ | 39.6 | 44.4 |
| $O_2$ | 3.8 | 4.0 |

What is claimed is:

1. A process for obtaining metal oxides and $SO_2$-containing exhaust gases essentially free of $SO_3$ and $H_2SO_4$ from feed salt which contains ferrous sulphate in an amount of 40 to 85% by weight ferrous sulphate calculated without water of crystallization through thermal decomposition in a circulating fluidized bed; the fluidized state of which is maintained by oxygen-containing fluidized gas which has been preheated and by oxygen-containing secondary gas and which has been preheated and fed above the inlet for the fluidizing gas, with fuel being fed into the zone between inlets for the fluidizing gas and secondary gas; wherein a major part of the resulting metal oxide is discharged together with the exhaust gases from the top part of a shaft and is separated from the exhaust gases in a recycling cyclone and is recycled at least in part to the fluidized bed; comprising contacting the exhaust gases from the fluidized bed reactor, which exhaust gases contain $SO_2$ and are essentially free of $SO_3$ and $H_2SO_4$, with said feed salt which feed salt contain at least 1 mol of water of crystallization for a time sufficient to insure oxidation of the divalent iron to trivalent iron in a single suspension type exchanger, introducing the contacted feed salt into the circulating fluidized bed reactor to effect decomposition thereof into metal oxide and removing the metal oxide and exhaust gases through the top of said shaft; characterized in that the exhaust gases used to contact the feed salt result from the reaction of the oxygen containing gases with said fuel and contacted feed salt in the fluidized reactor, the fluidized gas and at least a partial stream of the secondary gas stream are heated by an indirect heat exchange in a fuel-heated heat exchanger, and the quantity of oxygen introduced via the fluidizing gas and the secondary gas is controlled dependent on the quantity of fuel in order to receive an exhaust from the suspension type exchanger with a free oxygen content of 1–6% by volume and a temperature of 300°–450° C.

2. A process according to claim 1, characterized in that fuel is fed at a constant rate into the zone between the inlets for the fluidizing gas and the secondary gas and the exhaust gas is adjusted at the desired temperature by a control of the temperature to which the fluidizing gas and the secondary gas are indirectly heated.

3. A process according to claim 1, characterized in that the oxygen contents of the fluidizing gas and secondary gas are controlled so that a mean oxygen concentration of at least 25% by volume results.

4. A process according to claim 1, characterized in that the feed salt containing mainly ferrous sulfate also contains adhered sulfuric acid.

5. A process according to claim 1, wherein iron oxide formed in the decomposition of the feed salt is added to the salt containing essentially ferrous sulfate and adhering sulfuric acid prior to its being fed to the suspension type exchanger.

6. A process for obtaining metal oxides and $SO_2$-containing exhaust gases essentially free of $SO_3$ and $H_2SO_4$ from feed salt which contains ferrous sulphate in an amount of 40 to 85% by weight ferrous sulphate calculated without water of crystallization through thermal decomposition in a circulating fluidized bed; the fluidized state of which is maintained by oxygen-containing fluidized gas containing at least 30% by volume oxygen and by oxygen-containing secondary gas, fed above the inlet for the fluidized gas, with fuel being fed into the zone between inlets for the fluidizing gas and secondary gas; wherein a major part of the resulting metal oxide is discharged together with the exhaust gases from the top part of a shaft and is separated from the exhaust gases in a recycling cyclone and is recycled at least in part to the fluidized bed; comprising contacting the exhaust gases from the fluidized bed reactor, which exhaust gases contain $SO_2$ and are essentially free of $SO_3$ and $H_2SO_4$, with said feed salt which feed salt contain at least 1 mol of water of crystallization for a time sufficient to insure oxidation of the divalent iron to trivalent iron in a single suspension type exchanger, introducing the contacted feed salt into the circulating fluidized bed reactor to effect decomposition thereof into metal oxide and removing the metal oxide and exhaust gases through the top of said shaft; characterized in that the exhaust gases used to contact the feed salt result from the reaction of the oxygen containing gases with said fuel and contacted feed salt in the fluidized reactor, and the quantity of oxygen introduced via the fluidizing gas and the secondary gas is controlled dependent on the quantity of fuel in order to receive an exhaust from the suspension type exchanger with a free oxygen content of 1–6% by volume and a temperature of 300°–450° C.

* * * * *